United States Patent [19]
Anscher

[11] Patent Number: 5,781,970
[45] Date of Patent: Jul. 21, 1998

[54] STRAP RETAINER

[75] Inventor: Joseph Anscher, Muttontown, N.Y.

[73] Assignee: National Molding Corp., Farmingdale, N.Y.

[21] Appl. No.: 971,844

[22] Filed: Nov. 14, 1997

[51] Int. Cl.$^6$ .................................................. A44B 21/00
[52] U.S. Cl. ................ 24/573.5; 24/16 PB; 24/265 AL; 24/598.2
[58] Field of Search ............... 70/457–459; 24/598.2, 24/601.2, 702, 669, 16 PB, 265 AL, 573.5; 280/33.992, 33.993

[56] References Cited

U.S. PATENT DOCUMENTS

| | | | |
|---|---|---|---|
| 5,138,855 | 8/1992 | Faris | 70/457 |
| 5,263,726 | 11/1993 | Wood | 280/33.992 |
| 5,333,361 | 8/1994 | Schaede | 24/30.5 R X |
| 5,669,118 | 9/1997 | Frano et al. | |

*Primary Examiner*—James R. Brittain
*Attorney, Agent, or Firm*—Collard & Roe, P.C.

[57] ABSTRACT

A strap retainer comprising a flexible elongated body having two planar sides and two free ends adapted for closure on to each other. A locking pawl is integrally formed with one free end and comprises a post and a head section forming a free end. A receptacle for the locking pawl is integrally formed with the other free end. The receptacle has top and bottom surfaces that are parallel to the planar sides of the body. There is a cavity in the top surface of the receptacle, having an enlarged section and a narrow section extending through the free end of the receptacle. The enlarged section is longer than the head section of the locking pawl and the narrow section is narrower than the head section of the locking pawl. There is at least one flexible locking tooth in the enlarged section of the cavity that protrudes into the cavity. A shoulder element is arranged on each side of the cavity to define an insertion area in the top surface of the receptacle corresponding to the shape of the locking pawl. Inserting the locking pawl into the cavity through the insertion area depresses the locking tooth, and sliding the locking pawl toward the free end of the receptacle releases the locking tooth and locks the locking pawl in the receptacle.

8 Claims, 3 Drawing Sheets

STRAP RETAINER

BACKGROUND OF THE INVENTION

1. Field of the Invention

This invention relates to a novel retainer for straps. In particular, the invention relates to a locking ring for straps used as seat belts for infants and small children in shopping carts or other vehicles.

2. The Prior Art

Shopping carts are often equipped with safety belts for securing a child in the seating area. The belts are typically a length of nylon webbing that is secured to the cart with a metal or plastic D-ring.

One such device is shown in U.S. Pat. No. 5,669,118 to Frano et al. This patent discloses a strap retainer in the form of a locking D-ring. The ring comprises a straight post and an integrally-formed arcuate retainer element that is snapped on to the post to lock the ring closed. The locking element comprises a protruding nail-like head on the post that slips into a keyhole shaped aperture in the arcuate retainer element.

Many manufacturers of child seat belts prefer to ship the belts with the strap retainers attached, for easy assembly onto the shopping carts at their destination point. The disadvantage of using the prior art strap retainer is that the strap can easily slide off of the open post during shipping. This would result in an unnecessary expenditure of time and effort reassembling the straps and retainers at their destination point.

Another disadvantage of the prior art strap retainer is its inability to withstand high amounts of tension. The locking elements are arranged at a 90° angle to the direction of force on the ring. This creates the risk that the locking elements, especially the nail-like head on the post, will break under high amounts of stress.

SUMMARY OF THE INVENTION

It is therefore an object of the present invention to provide a strap retainer that will not slip off of a strap when the retainer is in an unlocked position.

It is another object of the present invention to provide a strap retainer that can withstand high amounts of stress.

It is yet another object of the present invention to provide a strap retainer that is simple and inexpensive to manufacture.

These and other objects are achieved by a strap retainer comprising a flexible elongated body having two ends that can be locked onto each other to form a closed loop for holding a strap. The retainer has two planar sides and in a preferred embodiment, is a generally triangular shape formed by a first leg, a second leg and a third leg. The third leg is separated from the first leg to form an opening for insertion of a strap. A locking pawl is integrally formed with one end of the body. The locking pawl is comprised of a post attached to one end of the body, and an enlarged head section forming a free end.

A receptacle for the locking pawl is integrally formed with the other end of the elongated body and extends generally parallel to the second leg. The top and bottom surfaces of the receptacle are parallel to the planar sides of the body. The receptacle has a cavity in the top surface that extends down to, but not through, the bottom surface. The cavity has an enlarged section corresponding to the head of the locking pawl and a narrow section extending through the free end of the receptacle, which corresponds to the post of the locking pawl. The enlarged section is longer than the head section of the locking pawl, and the narrow section is narrower than the head section of the locking pawl.

There is at least one flexible locking tooth disposed in the enlarged section of the cavity, and protrudes into the cavity. Two shoulder elements are also arranged on each side of the cavity. The shoulder elements are shallow ledges arranged near the top surface of the receptacle and define an insertion area in the top surface of the receptacle corresponding to the shape of the locking pawl. The shoulder elements prevent the locking pawl from sliding up and out of the cavity once it is inserted into the cavity and slid backward into a locking position.

Inserting the locking pawl into the cavity through the insertion area depresses the locking tooth, so that the locking tooth is flush with the bottom of the cavity. Sliding the locking pawl toward the free end of the receptacle underneath the shoulder elements then releases the locking tooth, which springs back into the cavity and locks the locking pawl in the receptacle.

Once locked, the strap retainer stays in a closed position permanently. The locking arrangement makes the strap retainer more durable than others, because pressure on the receptacle from a strap being pulled is not exerted directly against the locking elements, which are the weakest points of the retainer, but rather parallel to them, which lessens the stress on the locking elements.

The shoulder elements preferably have a top surface that slopes downward toward the enlarged section of the opening. This shape facilitates the insertion of the locking pawl into the cavity, as downward pressure on the shoulder elements by the locking pawl causes the head section of the locking pawl to slide forward past the shoulder elements and down into the cavity.

The locking tooth is preferably integrally formed with the bottom surface of the receptacle, directly opposite the insertion area. However, the locking tooth may also be disposed on either or both of the sides of the receptacle as well. All that is necessary is that the tooth be positioned to depress flush with the cavity wall when the locking pawl is inserted, and release back into the cavity when the locking pawl is slid into the locking position.

The head section of the locking pawl can be any desired shape, but most preferably is in the shape of a truncated arrowhead. This shape has a flat tip and two flanges extending back on either side of the post. This form is most easily inserted and slid into the cavity with a minimum of friction, yet is strong enough to withstand high amounts of stress on the strap retainer.

The top surfaces of the flanges are preferably sloped downward away from the tip. This shape facilitates the sliding of the locking pawl underneath the shoulder elements and into a locking position.

To further ensure that the strap retainer stays in a permanently locked position, a stop platform is arranged on the top surface of the post of the locking pawl. This stop platform abuts the shoulder elements and prevents forward movement of the locking pawl within the cavity after locking. The stop platform provides further reinforcement to the locking tooth, which also prevents forward movement of the locking pawl.

To further facilitate the insertion of the locking pawl into the cavity, a protruding ridge is located on the bottom surface of the locking pawl near the body. When the locking pawl is placed over the cavity, the ridge abuts the free end of the receptacle and guides the locking pawl into the cavity when the locking pawl is inserted into the cavity. This element is necessary when the material of the strap retainer is relatively stiff and cannot be easily bent into position without additional leverage.

The strap retainer can be made out of any suitable material, but is preferably polypropylene, acetal or nylon. The strap retainer must be sufficiently flexible to be bent into the locking shape, but must also be sufficiently rigid and durable to withstand high amounts of tension. Preferably, the strap retainer is sufficiently rigid so that its shape is not deformed after the ends are locked together, even under high amounts of tension.

One way to accomplish the required balance of strength and flexibility is to form the body with several apertures therethrough, into a honeycomb shape. This shape prevents cracking of the entire body if one section is overly distressed, and lends additional flexibility to the body.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Referring now in detail to the drawings and, in particular, FIGS. 1-5, there are shown several views of the strap retainer according to the invention. Strap retainer 10 is formed into a generally triangular shape with two planar sides, having legs 12, 13 and 14 integrally formed together. Leg 14 is separated from leg 13 so that there are two free ends and an opening for insertion of a strap. A plurality of apertures 11 are formed in the body of strap retainer 10 to allow for additional strength and flexibility.

Figure 1:
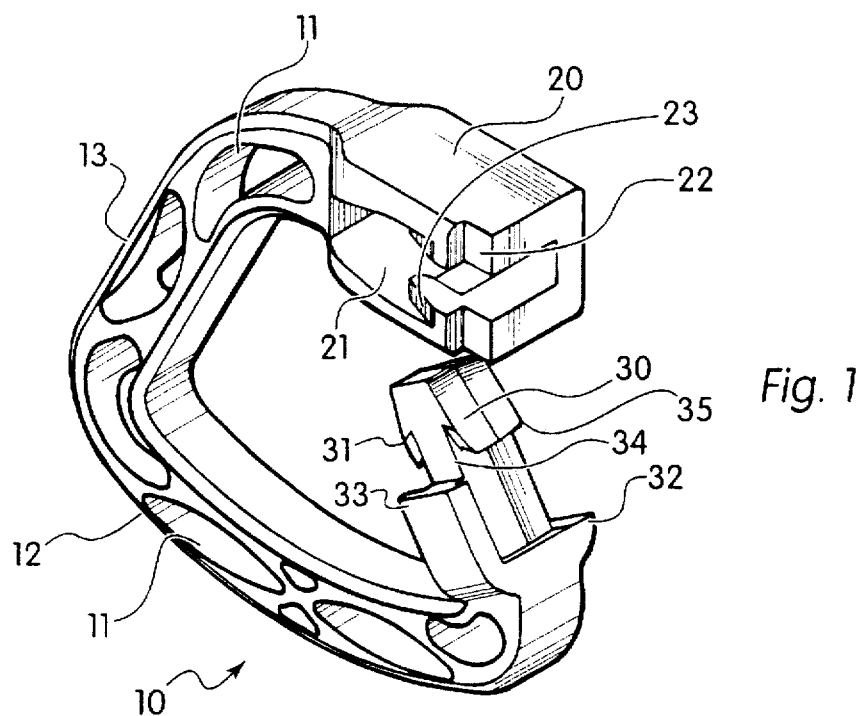
FIG. 1 shows a perspective view of the strap retainer according to the invention.

On the end of leg 14 is a locking pawl 30. Locking pawl 30 has a head section 31 in the shape of a truncated arrowhead, and a post 34 attached to the end of leg 14. Head section 31 has two flanges 35 that have a top surface that slopes downward away from the tip of head section 31, as shown in FIG. 1.

Figure 2:
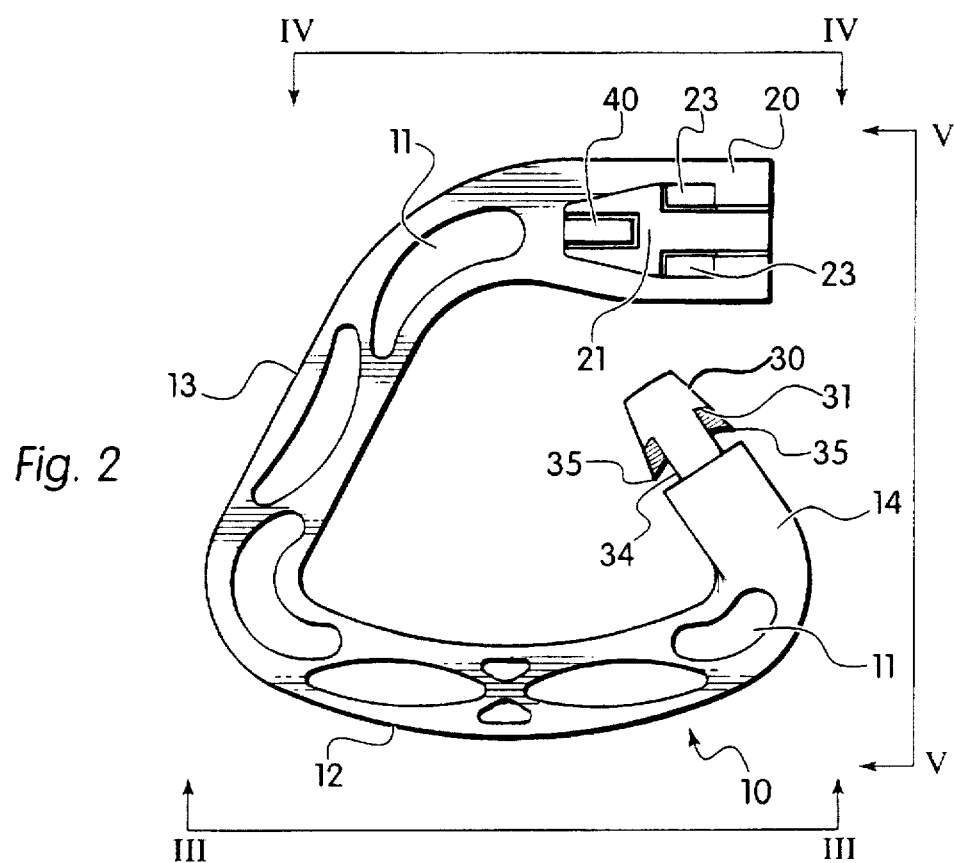
FIG. 2 shows a top view of the strap retainer according to the invention.
Figure 3:
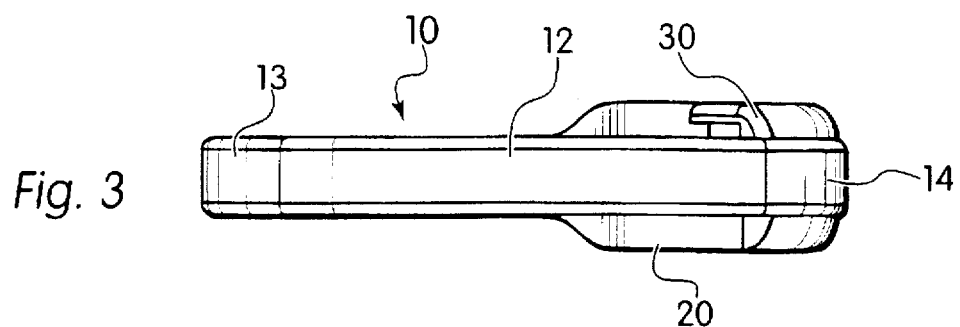
FIG. 3 shows a side view along lines III—III of FIG. 2.
Figure 4:
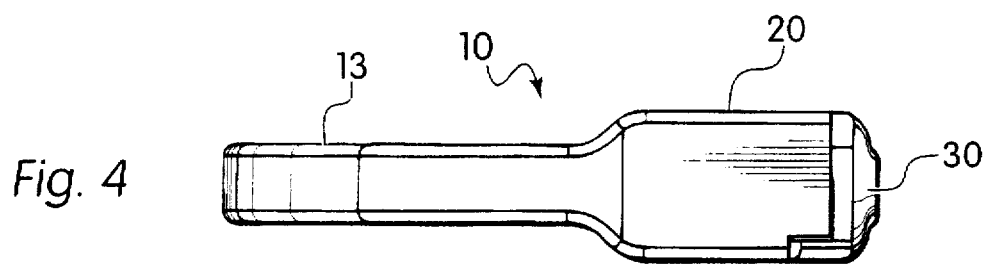
FIG. 4 shows a side view along lines IV—IV of FIG. 2.
Figure 5:
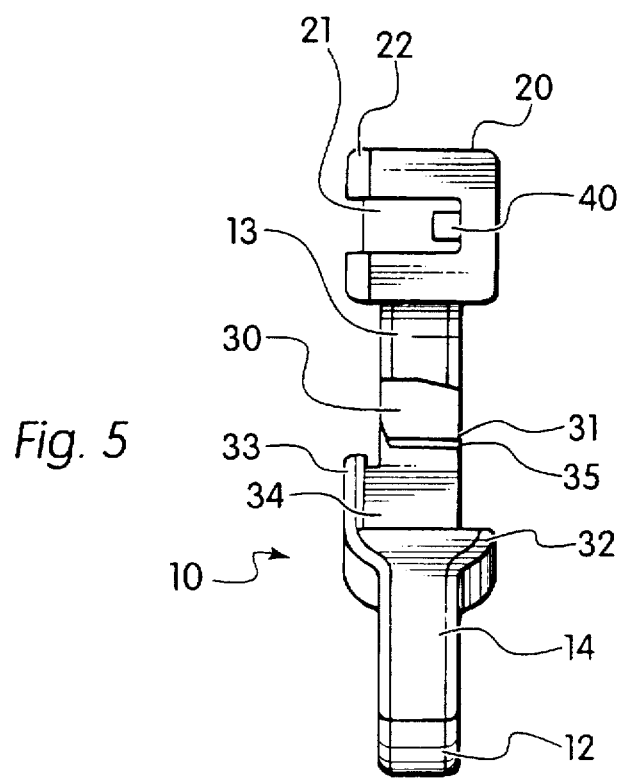
FIG. 5 shows a side view along lines V—V of FIG. 2.

Extending from the end of leg 13 is a receptacle 20 having a cavity 21 formed therein. Cavity 21 opens in a plane parallel to the planar sides of strap retainer 10. Cavity 21 extends through the free end of receptacle 20, as shown in FIGS. 1 and 5. Cavity 21 is equipped with two shoulder elements 23, which are arranged on either side of cavity 21 and define an insertion area in the top surface of receptacle 20 that corresponds to the shape of locking pawl 30. Underneath shoulder elements 23, cavity 21 has an enlarged section that is longer than head 31 of locking pawl 30, and a narrow section 22 that extends through the free end of receptacle 20. Narrow section 22 is narrower than head 31 of locking pawl 30, as shown in FIG. 2.

A flexible locking tooth 40 is disposed in cavity 21 on the bottom surface of receptacle 20. Locking tooth 40 is integrally formed with receptacle 20 and extends into cavity 21, as shown in FIGS. 5–8.

Strap retainer 10 can be shipped to a shopping cart manufacturer or supermarket in an unlocked position with a safety belt formed from a length of webbing already threaded therethrough. The triangular shape of strap retainer 10 keeps a loop of webbing from inadvertently sliding off of the retainer, even when the retainer is in an unlocked position.

Figure 6:
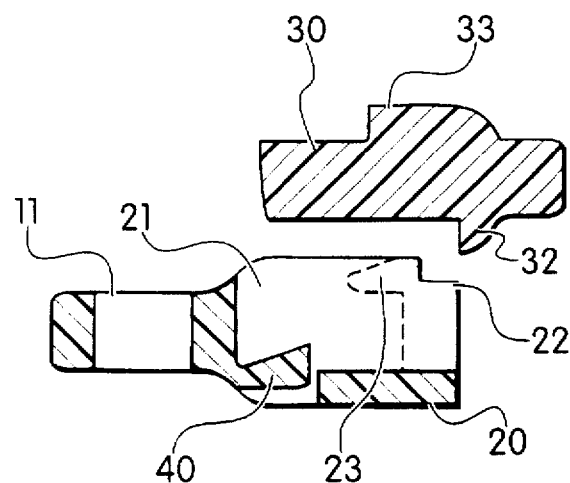
FIG. 6 shows a cross-sectional view of the locking pawl and receptacle according to the present invention prior to locking.
Figure 7:
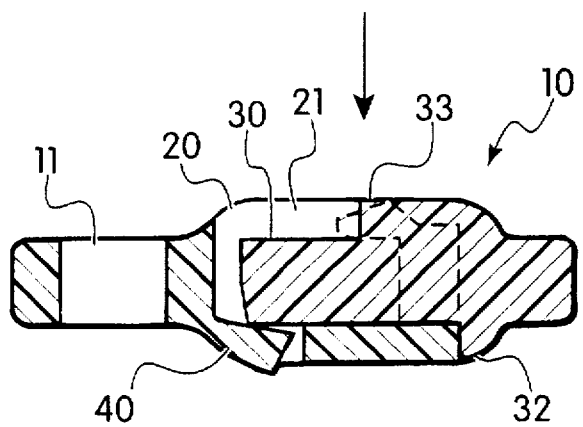
FIG. 7 shows a cross-sectional view of the locking pawl and receptacle in an inserted but unlocked position.

Locking strap retainer 10 proceeds as follows: Locking pawl 30 is brought into an aligned position above cavity 21 of receptacle 20, as shown in FIG. 6. This is accomplished simply by bending strap retainer 10 into a desired position. Then, as shown in FIG. 7, locking pawl 30 is forced downward into cavity 21. A ridge 32 positioned on the underside of locking pawl 30 abuts receptacle 20 and guides locking pawl 30 into a desired position. Ridge 32 also provides additional leverage for bending retainer 10, which is fairly rigid.

Figure 8:
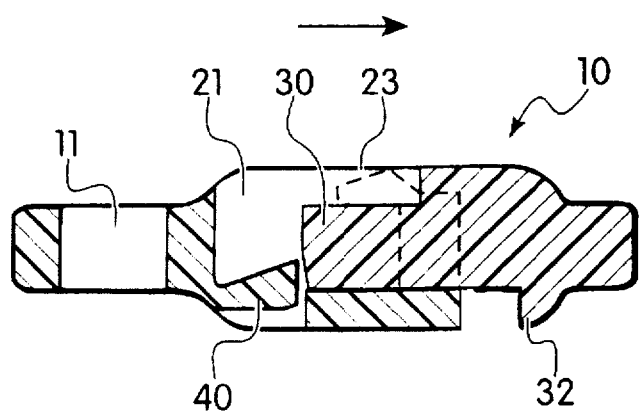
FIG. 8 shows a cross-sectional view of the locking pawl and receptacle in the locked position.

At this point, locking pawl 30 forces locking tooth 40 downward, so that locking tooth 40 is flush with the bottom surface of cavity 21, as shown in FIG. 7. To lock receptacle 10 together, locking pawl 30 is then slid back into cavity 20 underneath shoulder elements 23 until it completely passes locking pawl 40. At this point, locking pawl 40 is then released back into a protruding position, as shown in FIG. 8. In the locked position shown in FIG. 8, locking pawl 30 is permanently positioned within cavity 21 and strap retainer 10 is thus securely locked together. The enlarged head section of locking pawl 30 cannot pass through narrow section 22 of receptacle 20. Stop platform 33 provides further locking stability by abutting receptacle 20 and preventing any forward movement of locking pawl 30 after it is locked into cavity 21.

The specific locking arrangement of the present invention provides a much stronger strap retainer than those shown in the prior art. This is due to the placement of the opening of cavity 21 in a plane parallel to the planar sides of the clip body. This arrangement ensures that tension on clip body from a strap or belt inserted through the strap retainer is not exerted perpendicular to the opening, but rather parallel to it. Thus, the strap retainer according to present invention can withstand forces of up to 220 lbs out risk of damage. This is significantly more than only used strap retainers, which crack at approximately lbs of force.

Accordingly, while only a single embodiment of the present invention has been shown and described, it is obvious many changes and modifications may be made thereunto out departing from the spirit and scope of the invention.

What is claimed is:

1. A strap retainer comprising:
    a flexible elongated body having two planar sides, a first end and a second end adapted for closure onto said first end; and
    a locking pawl comprising a head section connected to said first end by a post, said locking pawl having a top surface and a bottom surface;

a receptacle for the locking pawl integrally formed with the second end, said receptacle having a free end, a top surface and a bottom surface, said top and bottom surfaces being in planes parallel to the planar sides of the body, and comprising:
  (a) a cavity in the top surface of the receptacle, said cavity having an enlarged section and a narrow section extending through the free end of the receptacle, said enlarged section being longer than the head section of the locking pawl and said narrow section being narrower than the head section of the locking pawl;
  (b) at least one flexible locking tooth disposed in the enlarged section of the cavity, said locking tooth protruding in to the cavity; and
  (c) a shoulder element arranged on each side of the cavity so as to define an insertion area in the top surface of the receptacle corresponding to the shape of the locking pawl;

wherein inserting the locking pawl into the cavity through the insertion area depresses the locking tooth, and sliding the locking pawl toward the free end of the receptacle underneath the shoulder elements releases the locking tooth into the cavity to lock the locking pawl within the receptacle.

2. The strap retainer according to claim 1, wherein the locking tooth is integrally formed with the bottom surface of the receptacle.

3. The strap retainer according to claim 1, wherein the shoulder elements each have a top surface that slopes downward toward the enlarged section of the cavity.

4. The strap retainer according to claim 1, further comprising a stop platform arranged on the top surface of the locking pawl, said stop platform abutting the shoulder elements and preventing forward movement of the locking pawl within the cavity after locking.

5. The strap retainer according to claim 1, wherein the head section of the locking pawl is in the shape of a truncated arrowhead, said arrowhead having a flat tip and two flanges, each flange being integrally formed with a side of the post.

6. The strap retainer according to claim 5, wherein the flanges each have a top surface that slopes downward away from the free end.

7. The strap retainer according to claim 1, further comprising a protruding ridge on the bottom surface of the locking pawl near the first end of the body, said ridge abutting the free end of the receptacle and guiding the locking pawl into the cavity when the locking pawl is inserted into the cavity.

8. The strap retainer according to claim 1, wherein the elongated body has a plurality of apertures extending through the planar sides.

* * * * *